United States Patent [19]

Yasui et al.

[11] Patent Number: 4,876,921

[45] Date of Patent: Oct. 31, 1989

[54] DIFFERENTIAL GEAR UNIT WITH LIMITED SLIP MECHANISM

[75] Inventors: Yasuyoshi Yasui; Hitoshi Azuma, both of Toyota, Japan

[73] Assignee: Toyota Jidosha Kabushiki Kaisha, Toyota, Japan

[21] Appl. No.: 143,486

[22] Filed: Jan. 13, 1988

[30] Foreign Application Priority Data

Jan. 13, 1987 [JP] Japan ............................ 62-4176[U]

[51] Int. Cl.$^4$ .............................................. F16H 1/44
[52] U.S. Cl. .................................... 74/710.5; 74/713; 193/93 A
[58] Field of Search ................... 74/710.5, 711, 713; 192/93 A; 180/250

[56] References Cited

U.S. PATENT DOCUMENTS

| | | | |
|---|---|---|---|
| 3,404,585 | 10/1968 | Roper | 192/93 A |
| 3,572,165 | 3/1971 | Roper | 192/93 A |
| 3,886,813 | 6/1975 | Baremor | 74/710.5 |
| 3,994,375 | 11/1976 | Stritzel | 74/710.5 |
| 4,249,429 | 2/1981 | Denning | 74/710.5 |
| 4,290,321 | 9/1981 | Wilson | 74/710.5 |
| 4,389,909 | 6/1983 | Goscenski, Jr. | 74/711 |
| 4,462,272 | 7/1984 | Roper | 192/93 A |
| 4,513,633 | 4/1985 | Goscenski, Jr. | 74/710.5 |
| 4,700,823 | 10/1987 | Winckler | 74/711 |
| 4,757,727 | 7/1988 | Teraoka et al. | 192/93 A |

FOREIGN PATENT DOCUMENTS

| | | |
|---|---|---|
| 56-21942 | 5/1981 | Japan . |
| 60-51340 | 4/1985 | Japan . |
| 60-127154 | 8/1985 | Japan . |
| 61-141131 | 9/1986 | Japan . |

Primary Examiner—Leslie A. Braun
Assistant Examiner—Christopher C. Campbell
Attorney, Agent, or Firm—Cushman, Darby & Cushman

[57] ABSTRACT

A differential gear unit provided with a limited slip mechanism which comprises a first cam element integral with one side gear, a second cam element axially slidable and rotatable on a hub portion of the side gear and being engaged with the first cam element to be axially displaced by its cam action when rotated relatively to the first cam element, and a friction clutch mechanism disposed between the second cam element and an internal end wall of a differential case to be engaged in response to the axial displacement of the second cam element. The limited slip mechanism further includes a clutch ring axially slidably mounted within the differential case in surrounding relationship with the second cam element, the clutch ring being formed at an inner periphery thereof with a conical surface for frictional engagement with a corresponding conical surface formed on an outer periphery of the second cam element. The clutch ring is operatively connected to a manually controlled penumatic actuator to be shifted between a disengaged position where it is disengaged from the second cam element and an engaged position where it is engaged with the second cam element to effect relative rotation between said cam elements.

8 Claims, 2 Drawing Sheets

DIFFERENTIAL GEAR UNIT WITH LIMITED SLIP MECHANISM

BACKGROUND OF THE INVENTION

1. Field of the Invention

The present invention relates to a differential gear unit for motor vehicles, and more particularly to a differential gear unit provided with a limited slip mechanism for restricting the differential function of the gear unit when a difference in rotational speed between side shafts exceeds a predetermined value.

2. Description of the Prior Art

In Japanese Patent Publication No. 56-21942, there has been proposed a differential gear unit provided with such a limited slip mechanism as described above which comprises a first cam element integral with one side gear of the gear unit, a second cam element axially slidably and rotatably mounted on a hub portion of the side gear and being engaged with the first cam element to be axially displaced by its cam action when rotated relatively to the first cam element, a friction clutch assembly including a first set of cluth discs axially slidably mounted on the hub portion of the side gear for rotation therewith and a second set of clutch discs axially slidably carried by the differential case for rotation therewith and being interposed between the first set of clutch discs for frictional engagement therewith, and means for effecting relative rotation between the cam elements when a difference in rotational speed between side shafts excees a predetermined value.

In operation of the limited slip mechanism, axial displacement of the second cam element is caused by relative rotation between the cam elements, and in turn the first set of clutch discs are brought into frictional engagement with the second set of clutch discs in response to the axial displacement of the second caam element to restrict the differential function of the gear unit. When the differential function of the gear unit is instantly restricted in response to relative rotation between the cam elements, unpleasasnt shocks will occur during travel of the vehicle. If the left and right road wheels alternately spin during travel of the vehicle on a desert road, the differential gear unit will be frequently locked and released. If one of the road wheels spins during travel of the vehicle on a roaad of low frictional coefficient, the differential gear unit will be locked unexpectedly.

SUMMARY OF THE INVENTION

It is, therefore, a primary object of the present invention to provide an improved differential gear unit wherein the limited slip mechanism is arranged to restrict the differential function of the gear unit under control of the driver.

According to the present invention, the object is attained by providing a differential gear unit wherein a clutch ring is axially slidably mounted within the differential case in surrounding relationship with the second annular cam element, the clutch ring being formed with at an inner periphery thereof with a conical surface for frictional engagement with a corresponding conical surface formed on an outer periphery of the second cam element, and wherein a shift mechanism is operatively connected to the clutch ring to shift the cluth ring between a disengaged position where it is disengaged from the second cam element and an engaged position where it is engaged with the second cam element to effect relative rotation between the cam elements. In a practical embodiment of the present invention, the shift mechanism is operated under manual control of the driver to shift the clutch ring to the engaged position so as to restrict the differential function of the gear unit.

BRIEF DESCRIPTION OF THE DRAWINGS

Additional objects, features and advantages of the present invention will become readily apparent from the following detailed description of a preferred embodiment thereof when taken together with the accompanying drawings, in which.

DESCRIPTION OF THE PREFERRED EMBODIMENT

Figure 1:
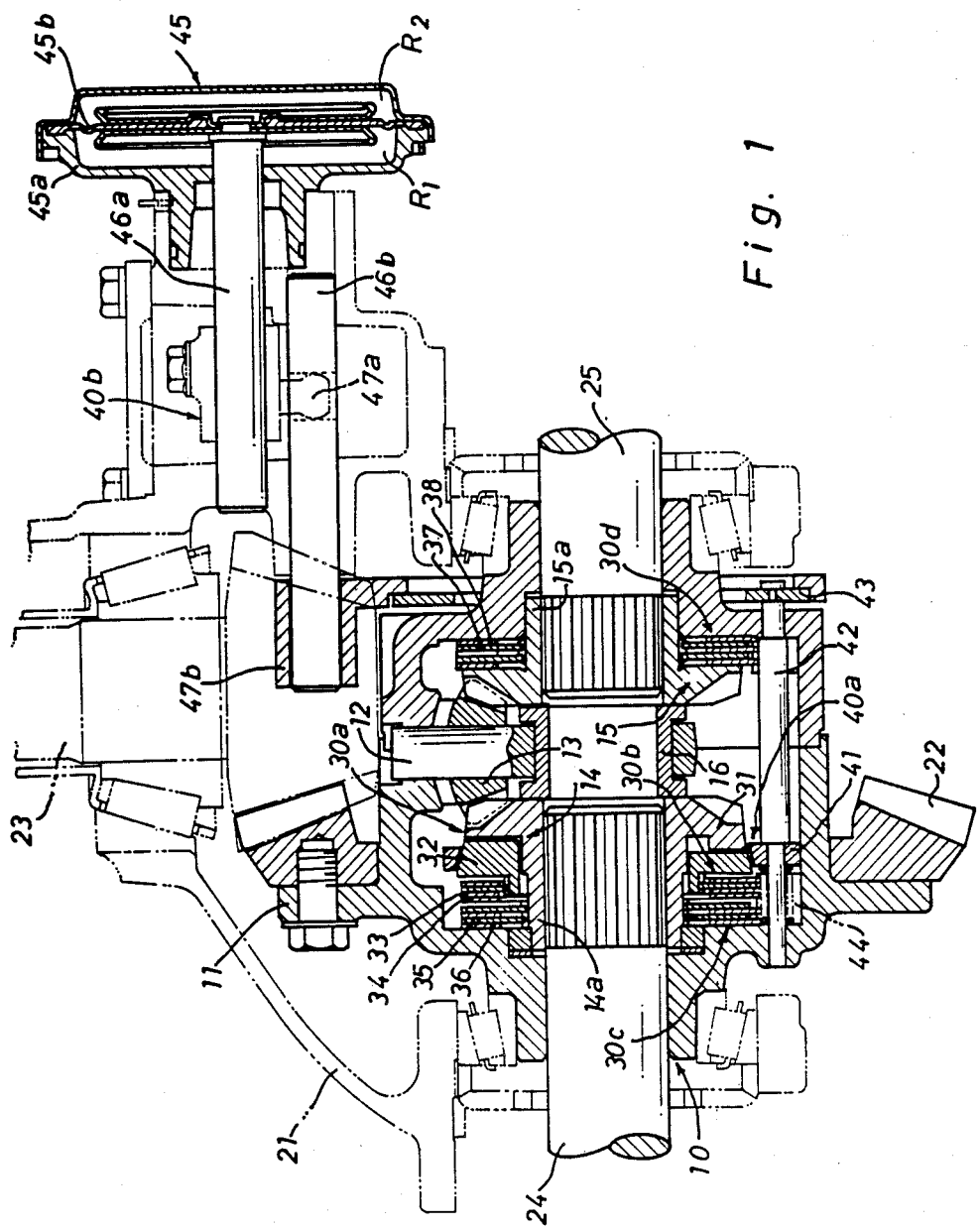
FIG. 1 is a sectioned plan view of a differential gear unit equipped with a limited slip mechanism in accordance with the presentn invention.

In FIG. 1 of the drawings, there is illustrated a differential gear unit 10 equipped with a limited slip mechanism in accordance with the present invention. The differential gear unit 10 comprises a differential case 11 rotatably mounted within a differential housing 21, a ring gear 22 secured to an external annular flange of differential case 11 for rotation about a first axis, a plurality of pinion gears 13 each rotatably mounted within the differential case 11 by means of a cross rod 12 for rotation about a second axis perpendicular to the first axis, a pair of side gears 14, 15 rotatably mounted within the differential casea 11 for rotation about the first axis and in meshing engagement with the pinion gears 13, and a pair of side shafts 24, 25 each splined to the side gears 14, 15 at their inner ends. The ring gear 22 is permanently meshed with a pinion integral with an input shaft 23 which is rotatably mounted within the differential housing 21 for rotation about the second axis. Thus, the differential gear unit 10 operates to transmit the power from input shaft 23 to the side shafts 24, 25 through the ring gear 22, differential case 11, pinion gears 13 and side gears 14, 15.

Figure 2:
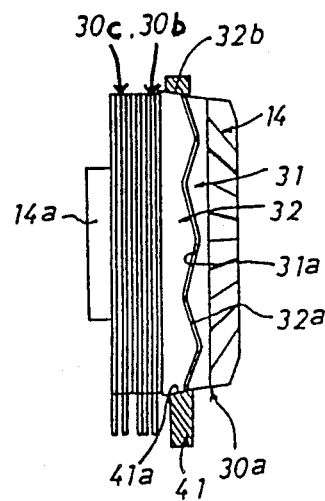
FIG. 2 is a side view of the limited slip mechanism shown in FIG. 1.

The limited split mechanism includes a cam mechanism 30a, clutch mechanisms 30b, 30c, 30d, a cone clutch mechanism 40a, and a shift mechanism 40b. As shown in FIGS. 1 and 2, the cam mechanism 30a comprises a first annular cam element 31 integral with the left-hand side gear 14 and a second annular cam element 32 axially slidably mounted on a cylindrical hub portion 14a of side gear 14 for relative rotation thereto. The second annular cam element 32 is formed at one side thereof with circumferentially inclined cam surfaces 32a for engagement with corresponding cam surfaces 31a formed on the first annular cam element 31.

The clutch mechanisms 30b and 30c are disposed between the second cam element 32 and an internal end wall of differential case 11. The clutch mechanism 30b comprises a first set of clutch discs 33 axially slidably mounted on a cylindrical hub portion of second cam element 32 for rotation therewith and a second set of clutch discs 34 axially slidably carried by the differential case 11 for rotation therewith aand interposed between the clutch discs 33 for frictional engagement therewith. The clutch mechanism 30c comprises a first set of clutch discs 35 axially slidably mounted on the cylindrical hub portion 14a of side gear 14 for rotation therewith and a second set of clutch discs 36 axially slidably carried by the differential case 11 and interposed between the clutch discs 35 for frictional engagement therewith. The clutch mechanism 30d is disposed between the right-hand side gear 15 and an internal end wall of differential case 11. The clutch mechanism 30d comprises a first set of clutch discs 37 axially slidably mounted on a cylindrical hub portion 15a of side gear 15 for rotation therewith and a second set of clutch discs 38 axially slidably carried by the differential case 11 for rotation therewith and interposed between the clutch discs 37 for frictional engagement therewith. Disposed between the side gears 14, 15 is a thrust block 16 which acts to apply an axial thrust force acting on the left-hand side gear 14 to the right-hand side gear 15.

Figure 3:
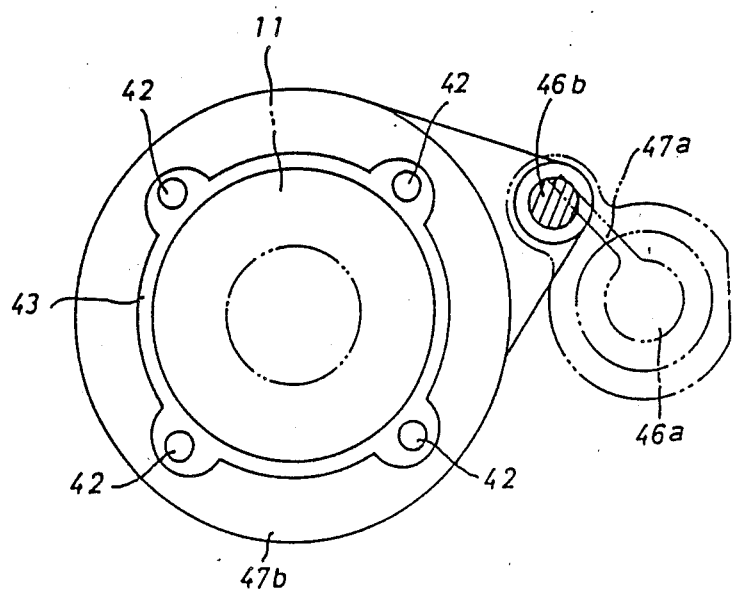
FIG. 3 is a front view of a shift mechanism shown in FIG. 1.

As shown in FIGS. 1 to 3, the cone clutch mechanism 40a comprises a clutch ring 41 carried by a plurality of circumferentially equally spaced slide rods 42 which are axially slidably mounted within the differential case 11. The clutch ring 41 is formed at its inner periphery with a conical surface 41a for frictional engagement with a corresponding conical surface 32b formed on the outer periphery of second cam element 32. The clutch ring 41 is maintained in engagement with each stepped portion of the slide rods 42 under the biasing force of compression coil springs 44 which are arranged respectively in surrounding relationship with the slide rods 42 and interposed between the clutch ring 41 and an internal end wall of the differential case 11. Thus, the slide rods 42 are retained in a rightwardly shifted position by abutment with an internal end wall of the differential case 11 under the biasing force of compression coil springs 44 so that the clutch ring 41 is disengaged from the second cm element 32. In addition, the slide rods 42 are connected at their outer ends to a connecting ring 43 for axial movement therewith.

The shift mechanism 40b comprises two shift rods 46a and 46b which are axially slidably mounted within the differentil housing 21 and arranged in parallel with the slide rods 42. The shift rid 46a is connected at its outer end with a pneumatic actuator 45 which is attached to an outer end of the differential housing 21. The shift rod 46a is connected to the shift rod 46b by means of an arm member 47a which is fixed at its base end to the shift rod 46a. The shift mechanism 40b further comprises a shift fork 47b carried by the shift rod 46b at its base end. As shown in FIG. 3, the shift fork 47b is in the form of an annular member which is coupled with the connecting ring 43. The penumatic actuator 45 comprises a diaphragm piston assembly 45b reciprocbale in a housing assembly 45a attached to the outer end of differential housing 21. The diaphragm piston assembly 45b includes a diaphragm hermetically secured at its outer periphery to the inner peripheral walls of housing assembly 45a to subdivide the interior of housing assembly 45a into two prsure chambers $R_1$ and $R_2$. The shift rod 46a extends into the housing assembly 45a and is connected at its outer end with the diaphragm piston assembly 45b. The pressure chambers $R_1$ an $dR_2$ of actuator 45 are connected to an electrically operated changeover valve (not shown) which is arranged to selectively connect the pressure chambers $R_1$ and $R_2$ to a vacuum source and the atmospheric air.

Assuming that the changeover valve is maintained in a deenergized condition to connect the pressure chambers $R_1$ and $R_2$ of actuator 45 to the atmospheric air and the vacuum source, the shift rods 46a, 46b are retained in their rightwardly shifted positions, and the slide rods 42 are retained intheir rightwardly shifted positions under the biasing force of compression coil springs 44. In such a condition, the clutch ring 41 is disengaged from the second cm element 32 to permit rotation of the second cam element 32 with the side gear 14 so as to effect the differential function of the gear unit 10. When the changeover valve is energized to connect the pressure chambers $R_1$ and $R_2$ of actuator 45 to the vacuum source and the atmospheric air, the diaphragm piston assembly 45b is displaced leftward by a difference in pressure between chambers $R_1$ and $R_2$ to shit the shift rods 46a, 46b leftward against the biasing force of compression coil springs 44. As a result, the clutch ring 41 is brought into frictional engagement with the second cam element 32 to restrict rotation of the second cam element 32 thereby to cause relative rotation between the cam elements 31 and 32. Subsequently, the second cam element 32 is displaced leftward by its cam action in response to relaative rotation between the cam elements 31, 32 to effect frictional engagement of the clutch mechanisms 30b, 30c. Simultaneously, the side gear 14 is displaced rightward by a reaction force applied thereto from the second cam element 32, and in turn the right-hand side gear 15 is thrusted by the thrust block 16 rightward to effect frictional engagement of the clutch mechanism 30d. Thus, the side gears 14,15 are connected to the differential case 11 to restrict the differential function of the gear unit 10.

When the changeover valve is deenergized to connect the pressure chambers $R_1$ and $R_2$ of ctuator 45 to the atmospheric air and the vacuum source, the diaphragm piston assembly 45b is displaced rightward by a difference in pressure between chambers $R_1$ and $R_2$ to shift the shift rods 46a, 46b rightward, and in turn the slide rods 42 are returned to the rightwardly shifted position under the biasing force of compression coil springs 44 to disengage the clutch ring 41 from the second cam element 32. Thus, the second cam element 32 is fully engaged with the first cam element 31 to rotate therewith, and in turn the clutch mechanisms 30b, 30c, 30d are disengaged to release the restriction of the differential function.

As is understood from the above description, the cone clutch mechanism 40a is operated under control of the pneumatic actuator 45 to cause relative rotation between the cam elements 31 and 32 so as to effect frictional engagement of the clutch mechanisms 30b, 30c and 30d. Accordingly, in the case that the changeover valve of the pneumatic actuator 45 is energized by manual control of the driver, the differential function of the gear unit 10 can be restricted or effected under the driver's intention. Furthermore, the pneumatic actuator 45 is useful to absorb unpleasant shocks caused by engagement of the friction clutch mechanisms 30b, 30c, 30d.

Although a specific embodiment of the present invention has been shown and described, it is obvious that many modifications and variations thereof are possible in light of these teachings. It is to be understood, therefore, that within the scope of the appended claims, the invention may be practiced otherwise than as specifically described herein.

What is claimed is:

1. A differential gear unit provided with a limited slip mechanism which comprises:
   a first annular cam element integral with one side gear of the gear unit, a second annular cam element axially slidably and rotatably mounted on a hub portion of said side gear and being engaged with said first annular cam element to be axially displaced by its cam action when rotated relatively to said first annular cam element, and a friction clutch mechanism including a first set of clutch discs slidably mounted on the hub portion of said side gear for rotation herewith and a second set of clutch discs axially slidably carried by a differential casea of the gear unit for rotation therewith and being interposed between the first set of clutch discs for frictional engagement therewith, wherein a clutch ring is axially slidably mounted within said differential case in surrounding relationship with said second annular cam element, said clutch ring being formed at an inner peiphery thereof with a conical surface for frictional engagement with a corresponding conical surface formed on an outer periphery of said second cam element.

wherein a shift mechanism is operatively connected to said clutch ring to shit said clutch ring between a disengaged position where it is disengaged from said second annularl cam element and an engaged position where it is engaged with said second annular cam element to effect relative rotation between said cam elements, wherein said clutch ring is carried by a plurality of circumferentially equally spaced slide rods which are axially slidably mounted within said differential case, and wherein said shift mechanism includes an axially movable shift rod arranged in parallel with said slide rods and operatively connected to said slide rods, and a actuator operatively connected to one end of said shift rod to be activated under control of a driver.

2. A differential gear unit as claimed in claim 1, wherein said slide rods each are loaded by a spring to retain said clutch ring in the disengaged position.

3. A differential gear unit as claimed in claim 1, wherein said slide rods are circumferentially equally spaced in surrounding relationship with said second annular cam element.

4. A differential gear unit s claimed in claim 1, wherein saiad actuator is a pneumatic actuator.

5. A differential gear unit provided with a limited slip mechanism which comprises a first annular cam element integral with one side gear of the gear unit., a second annular cam element axially slidably and rotatably mounted on a hub portion of said side gear and being engaged with said first annular cam elemlent to be axially displaced by its cam action when rotated relatively to said first annular cam element, and a friction clutch mechanism including a first set of clutch discs slidably mounted on the hub portion of said side gear for rotation therewith and a second set of clutch discs axially slidably carried by a differential case of the gear unit for rotation herewith and eing interposed between the first set of clutch discs for frictional engagement therewith, wherein a clutch ring is arranged in surrounding relationship with said second accular cam element and carried by a plurality of circumferentially spaced slide rods which are axially slidably mounted within said differential caasea, said clutch ring being formed at an inner periphery thereof with a conical surface for frictional engagement with a corresponding conical surface formed on an outer periphery of said second cam element, and wherein a shift mechanism is provided to shift said clutch ring between a disengaged position where it is disengaged from said second annular cam element and an engaged position where it is engaged with said second annular cam element to effect relative rotation between sai dcam elements, said shift mechanism including an axially movable shift rod arranged in parallel with said slide rods and operatively connected to said slide rods and an actuator operatively connected to one end of said shift rod to be activated under control of a driver.

6. A differential gelar unit as claimed in claim 5, wherein said slide rods are circumferentially equally spaced in surrounding relationship with said second annular cam element.

7. A differential gear unit as claimed in claim 5, wherein said actuator is a pneumatic actuator.

8. A differential gear unit as claimed in claim 5, wherein said slide rodds are loaded by a spring to retain said clutch ring in the disengaged position.

* * * * *